T. C. DOBBINS.
RESILIENT VEHICLE WHEEL.
APPLICATION FILED JAN. 12, 1918.
1,369,328.
Patented Feb. 22, 1921.
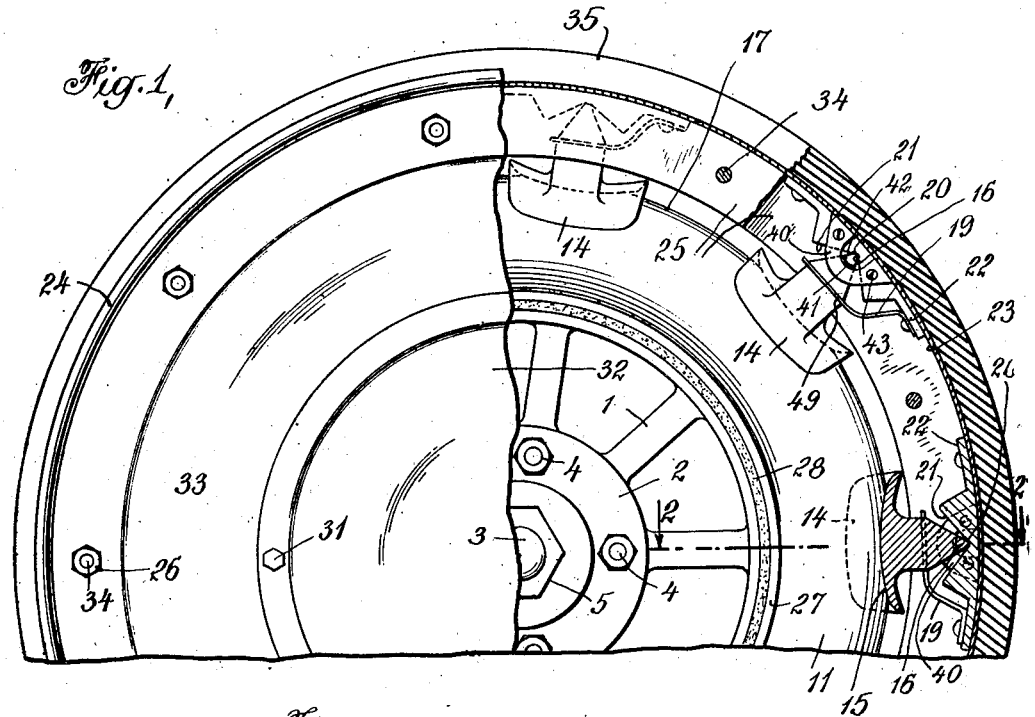
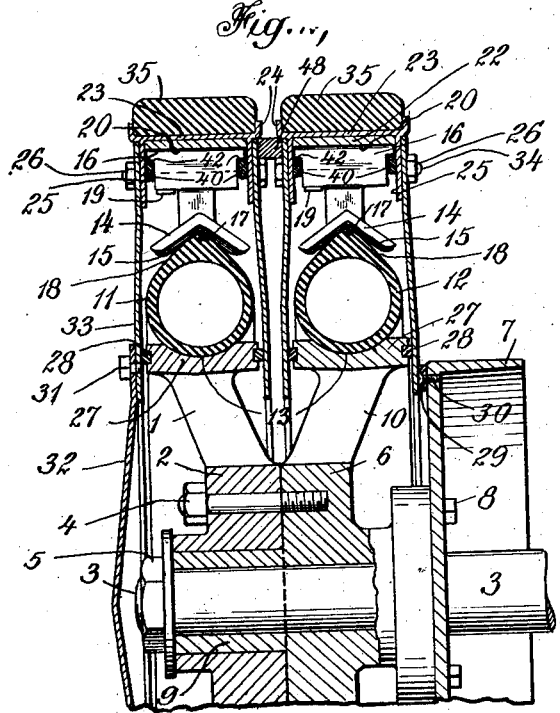
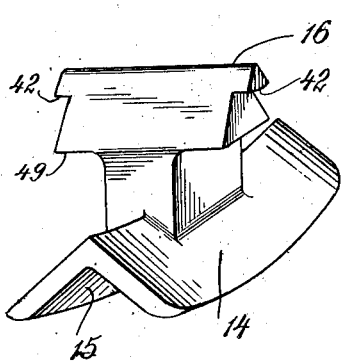
INVENTOR
Timothy C Dobbins
BY
Harry L Duncan ATTORNEY

UNITED STATES PATENT OFFICE.

TIMOTHY C. DOBBINS, OF LOS ANGELES, CALIFORNIA, ASSIGNOR, BY DIRECT AND MESNE ASSIGNMENTS, TO THE DOBBINS WHEEL COMPANY, A CORPORATION OF COLORADO.

RESILIENT VEHICLE-WHEEL.

1,369,328.  Specification of Letters Patent.  Patented Feb. 22, 1921.

Application filed January 12, 1918. Serial No. 211,679.

*To all whom it may concern:*

Be it known that I, TIMOTHY C. DOBBINS, a citizen of the United States, residing at Los Angeles, county of Los Angeles, and State of California, United States of America, having invented certain new and useful Improvements Relating to Resilient Vehicle-Wheels, do hereby declare that the following is a full, clear, and exact description of the same, taken in connection with the accompanying drawing, which forms part of this specification.

This invention relates especially to resilient wheels for automobiles, motor trucks and other vehicles, in which a wheel center or hub member is resiliently connected with an inclosing wheel rim member through a pneumatic or other resilient cushioning device, while at the same time the one or more wheel rim members used on each wheel are laterally guided with respect to the wheel center member so that undesirable lateral movement is prevented under running conditions. One of these wheel members is preferably provided with rocking contact shoes or members adapted to coöperate with the interposed resilient cushioning device and these rocking shoes are preferably formed with knife edge or rocking pivots coöperating with suitable socket bearing members formed in or secured to the wheel rim member, retainer devices being preferably used to positively prevent the disengagement of these coöperating bearing devices.

In the accompanying drawing showing in a somewhat diagrammatic way various illustrative embodiments of this invention, Figure 1 is a side elevation partly in section showing one form of the invention.

Fig. 2 is a partial enlarged transverse section thereof taken substantially along the line 2—2 of Fig. 1; and Fig. 3 is an enlarged perspective view of one of the contact shoes.

As illustrated and effective embodiment of this invention may comprise a wheel center member of any suitable construction with which one or more wheel rim members may be connected so as to move radially under running conditions in a resilient way to accommodate road irregularities. Where a dual type of construction is used the desired number of wheel rim members may be independently and resiliently mounted on a multiple wheel center member so as to be radially movable with respect thereto while preferably being laterally guided as by suitable lateral guiding plates which may also inclose the pneumatic or other resilient cushioning devices interposed between these wheel members. The wheel center member may comprise a hub section, such as 6, formed with integral or otherwise connected spokes 10 and grooved peripheral portion 27 and this hub may be mounted on the axle 3 in any suitable way as by a drive fit, other hub sections, such as 2, being, if desired, removably secured to the axle by fitting over a central bushing 9 on the hub member 6 and being bolted in position as by the stud bolts 4. This additional or outer hub section 2 may be formed with the spokes 1 and grooved peripheral portion 27 so that the desired number of pneumatic or other resilient cushioning devices 11, 12, may be mounted in these peripheral grooves 13 in the multiple wheel center member.

A corresponding number of wheel rim members may be used and may each comprise the flanged section rim 23 having outwardly extending tire flanges 24 to which the resilient or other tire 35 may be secured, while, if desired, inwardly extending integral flanges 25 may give additional strength to the wheel rim member so that an amply strong, light construction is secured. Any desired number of rocking contact shoes or members preferably having a gripping action on the interposed resilient cushioning device may be movably mounted on either of the wheel members, such, for instance, as the wheel rim members shown in the drawing. These contact shoes 14 may, if desired, be formed with a suitable grooved contact face which may advantageously be given a V-shaped cross-section so as to desirably coöperate with the V-shaped contact face of the resilient cushioning device which preferably has a somewhat less angle so that the initial contact between these parts occurs adjacent the rounded edge 17 of the pneumatic cushioning device in the form of a special single tube pneumatic tire, for instance. Each contact shoe may as indicated in Fig. 1, be somewhat curved in a circumferential direction so that as it rocks it has a cam action so as to exert in increased gripping pressure against the resilient cushioning device and thus positively prevent any undesirable frictional slip or movement between these parts under working conditions. Furthermore, the downwardly acting weight on the wheel causes the lower contact members to embed themselves in the cushioning device to a greater extent and this progressive embedding action causes a slow creeping movement of the contact shoes around the cushioning device so that a creep of three to six inches more or less takes place per mile of travel and prevents undesirable localized wear on the cushioning device. To minimize friction these rocking contact shoes are preferably provided with knife edge or rocking pivot bearings comprising, for instance, the knife edge pivot 16 extending transversely of the gripping shoe so as to insure its rocking substantially in the plane of the wheel. A suitable coöperating bearing member, such as 22, comprising a suitable socket 21, may be bolted or otherwise secured to the rim member at intervals around the same, as shown in Fig. 1, so that ample rocking movement of the shoes can take place in a substantially frictionless manner, although, of course, the edge of the rocking pivot on these shoes may be slightly rounded at 20, if desired. In most cases it is desirable to have suitable retainers loosely but permanently connecting these bearing members, and for this purpose the retainers 40 may be secured as by the screws 43 to the bearing members 22 on both sides of the same so that their pivot apertures 41 loosely embrace the reduced pivot extensions 42 on both sides of the knife edge pivots of these contact shoes, as shown in Fig. 3. These pivot extensions are under normal running conditions out of contact with the retainers, but in case of severe road impacts the upper contact shoes are sometimes momentarily released and under these conditions or when the pneumatic cushioning device becomes unduly deflated these retainers prevent disengagement of these coöperating knife edge bearing devices for the contact shoes, so that they cannot become displaced. It is also desirable in some cases to provide suitable alining devices to automatically restore these contact shoes to proper alinement whenever they become momentarily released from the cushioning device, and for this purpose suitable alining springs 19 may be provided on one or both sides of each of the contact shoes so as to normally resiliently engage the alining faces 49 thereof. In this way the contact member whenever released so that it can rock freely automatically swings into alined radial position.

In order to laterally guide the wheel members under running conditions lateral guiding and inclosing plates, such as 33, may be secured to both sides of the wheel rim member, for instance, as by the bolts 34 and nuts 26, so that these plates inclose the cushioning device and also considerably strengthen and stiffen the wheel rim member against which the plates may fit quite closely at their peripheries. An additional center cover plate, such as 32, may be secured in place as by the bolts 31 so as to inclose the hub of the wheel. Suitable anti-friction bearing rings or members 28 may be interposed between the peripheral portions of the wheel center member and these lateral guiding plates and a similar bearing packing member 29 may be secured as by the countersunk screws 30 to the brake drum 7 fastened as by the bolts 8 to the hub of the wheel. These packing rings or members may be of graphitized asbestos or other strong wear resisting packing material so as to guide the parts and simultaneously prevent access of dirt or dust to the interior of the wheel and a somewhat softer circumferentially arranged packing 48 of somewhat similar material may be interposed between the two wheel rim members adjacent their peripheries so as to prevent dirt working in at this point while still allowing the desired independent radial movement of the rim members. Each of the wheel rim members is thus free to move radially and closely follow the road surface so that it has considerable supporting action and a correspondingly greater cushioning of road irregularities or bumps is thus secured with a minimum localized pressure or wear on the tires.

This invention has been described in connection with a number of illustrative embodiments, parts, proportions, forms, materials and methods of construction and use, to the details of which disclosure the invention is not of course to be limited, since what is claimed as new and what is desired to be secured by Letters Patent is set forth in the appended claims:

1. In resilient vehicle wheels, a multiple wheel center member comprising hub sections to be secured to an axle and removably bolted together, each of said hub sections having a grooved peripheral portion, a pneumatic resilient cushioning device mounted in each of said grooved peripheral portions and having a V-shaped outer edge, a wheel rim member encircling and coöperating with each of said cushioning devices and comprising a flanged rim and tire and a series of rocking contact shoes having V-shaped contact faces to engage said cushioning device, said contact shoes having knife edge pivot portions formed with reduced pivot extensions on the laterally extending ends thereof and coöperating bearing members formed with sockets and retainers loosely engaging said pivot extensions to prevent disengagement from said bearing members, an alining spring resiliently engaging an alining face on said shoe to normally aline the same when it is released by said cushioning device, and lateral guiding closing plates removably secured to said wheel rim members to inclose and laterally guide the same with relation to the peripheral portions of said wheel center member under running conditions.

2. In resilient vehicle wheels, a multiple wheel center member comprising grooved peripheral portions, a resilient cushioning device mounted in each of said grooved peripheral portions and having a V-shaped outer edge, a wheel rim member encircling and coöperating with each of said cushioning devices and comprising a flanged rim and tire and a series of rocking contact shoes having V-shaped contact faces to engage said cushioning device, said contact shoes having knife edge pivot portions and coöperating bearing members, an alining spring resiliently engaging an alining face on said shoe to normally aline the same when it is released by said cushioning device, and lateral guiding closing plates removably secured to said wheel rim members to inclose and laterally guide the same with relation to the peripheral portions of said wheel center member under running conditions.

3. In resilient vehicle wheels, a multiple wheel center member comprising grooved peripheral portions, a resilient cushioning device mounted in each of said grooved peripheral portions, a wheel rim member encircling and coöperating with each of said cushioning devices and comprising a flanged rim and tire and a series of rocking contact shoes to engage said cushioning device, said contact shoes having knife edge pivot portions and coöperating bearing members, and lateral guiding closing plates removably secured to said wheel rim members to inclose and laterally guide the same with relation to the peripheral portions of said wheel center member under running conditions.

4. In resilient vehicle wheels, a multiple wheel center member comprising removably connected grooved peripheral portions, a plurality of pneumatic resilient cushioning devices movably mounted in said peripheral portions and each having a V-shaped outer edge, a wheel rim member inclosing and coöperating with each of said cushioning devices and comprising a flanged rim and tire and a series of rocking contact shoes mounted on said wheel rim members to engage said cushioning device only adjacent the edge portion thereof and lateral guiding inclosing means secured to the sides of said wheel rim members to laterally guide said wheel rim members under running conditions.

5. In resilient vehicle wheels, a multiple wheel center member comprising grooved peripheral portions, a plurality of pneumatic resilient cushioning devices mounted in said grooved peripheral portions and each having a V-shaped outer edge, a wheel rim member inclosing and coöperating with each of said cushioning devices and comprising a flanged rim and tire and a series of rocking contact shoes movably mounted on said wheel rim members and having V-shaped contact faces having a considerably greater angle than the outer edges of said cushioning devices to engage said cushioning devices adjacent the edge portions thereof and lateral guiding inclosing means secured to the sides of said wheel rim members to inclose said cushioning members and laterally guide said wheel members under running conditions.

6. In resilient vehicle wheels, a wheel center member comprising a peripheral portion, a resilient cushioning device mounted on said grooved peripheral portion and having a V-shaped outer edge, a wheel rim member encircling and coöperating with said cushioning device and comprising a flanged rim and tire and a series of rocking contact shoes having V-shaped contact faces to engage said cushioning device, said contact shoes having knife edge pivot portions formed with reduced pivot extensions on the laterally extending ends thereof and coöperating bearing members formed with sockets and retainers connected to said bearing members and loosely engaging said pivot extensions to prevent their disengagement from said bearing members.

7. In resilient vehicle wheels, a wheel center member comprising a peripheral portion, a resilient cushioning device mounted on said grooved peripheral portion, a wheel rim member encircling and coöperating with said cushioning device and comprising a flanged rim and tire and a series of rocking contact shoes to engage said cushioning device, said contact shoes having knife edge pivot portions formed with pivot extensions on the laterally extending ends thereof and coöperating bearing members formed with sockets and retainers loosely engaging said pivot extensions to prevent their disengagement from said bearing members.

8. In resilient vehicle wheels, a wheel center member, a wheel rim member encircling and coöperating with said wheel center member, a resilient cushioning device mounted between said wheel members, a series of rocking contact shoes to engage said cushioning device, said contact shoes having knife edge pivot portions formed with reduced pivot extension on the laterally extending ends thereof and coöperating bearing members formed with sockets and mounted on one of said wheel members and retainers connected to said bearing members and loosely engaging said pivot extensions to prevent their disengagement from said bearing members, and an alining spring resiliently engaging an alining face on said shoe to normally aline the same when it is released by said cushioning device.

9. In resilient vehicle wheels, a wheel center member, a wheel rim member encircling and coöperating with said wheel center member, a resilient cushioning device mounted between said wheel members, a series of rocking contact shoes to engage said cushioning device, said contact shoes having knife edge pivot portions, coöperating bearing members formed with sockets and mounted on one of said wheel members and retainers loosely engaging said pivot portions to prevent their disengagement from said bearing and an alining spring to normally aline the same when it is released by said cushioning device.

10. In resilient vehicle wheels, a wheel center member, a wheel rim member encircling and coöperating with said wheel center member, a resilient cushioning device mounted between said wheel members, a series of rocking contact shoes to engage said cushioning device, said contact shoes having knife edge pivot portions, coöperating bearing members mounted on one of said wheel members and an alining spring to normally aline the same when it is released by said cushioning device.

11. In resilient vehicle wheels, a wheel center member, a wheel rim member encircling and coöperating with said wheel center member, a resilient cushioning device mounted between said wheel members, a series of rocking contact shoes to engage said cushioning device, said contact shoes having knife edge pivot portions, coöperating bearing members mounted on one of said wheel members and retainers connected to said bearing members and loosely engaging said pivot portions to prevent their disengagement from said bearing members.

12. In resilient vehicle wheels, a wheel center member, an encircling wheel rim member, an interposed pneumatic resilient cushioning device, a series of rocking contact shoes to engage said cushioning device, and an alining spring resiliently engaging an alining face on each of said shoes to normally aline the same when it is released from said cushioning device.

13. In resilient vehicle wheels, a wheel center member, an encircling wheel rim member, an interposed pneumatic resilient cushioning device, a series of rocking contact shoes to engage said cushioning device, and an alining device engaging each of said shoes to normally aline the same when it is released from said cushioning device.

14. A resilient wheel of the character described comprising a wheel center member having a plurality of outwardly facing troughs, a plurality of independently movable rim members each having inwardly facing troughs, said troughs having diverging walls, a resilient member located between each of said rim members and said center member and provided with working surfaces, the divergence of said walls being greater than the inclination of said surfaces whereby only the peripheries of said surfaces will normally contact with the peripheries of said troughs and means carried by each of said rim members adapted to independently maintain said wheel members in substantial lateral alinement under running conditions.

TIMOTHY C. DOBBINS.

Witnesses:
 HARRY L. DUNCAN,
 JESSIE B. KAY.